United States Patent
Kubo et al.

(10) Patent No.: US 8,381,364 B2
(45) Date of Patent: Feb. 26, 2013

(54) WEDGE AND SOCKET ASSEMBLY

(75) Inventors: Kenneth Kubo, Milwaukie, OR (US);
Steven D. Hyde, Portland, OR (US)

(73) Assignee: ESCO Corporation, Portland, OR (US)

( * ) Notice: Subject to any disclaimer, the term of this patent is extended or adjusted under 35 U.S.C. 154(b) by 488 days.

(21) Appl. No.: 12/488,382

(22) Filed: Jun. 19, 2009

(65) Prior Publication Data

US 2009/0317180 A1    Dec. 24, 2009

Related U.S. Application Data

(60) Provisional application No. 61/075,233, filed on Jun. 24, 2008.

(51) Int. Cl.
*F16G 11/04* (2006.01)

(52) U.S. Cl. ............... 24/136 K; 24/136 L; 24/115 M; 403/211

(58) Field of Classification Search ............ 24/704.1, 24/704.2, 265 AL, 130, 122.6, 122.3, 136 R, 24/136 K, 115 M, 134 I; 403/281, 211
See application file for complete search history.

(56) References Cited

U.S. PATENT DOCUMENTS

| | | | |
|---|---|---|---|
| 1,248,991 A * | 12/1917 | Barger | 403/213 |
| 1,315,969 A | 9/1919 | Kienzle | |
| 1,355,004 A | 10/1920 | Sandford | |
| 2,348,608 A | 5/1944 | Cleverly | |
| 2,482,231 A | 9/1949 | White | |
| 2,597,626 A | 5/1952 | Eder | |
| 3,329,928 A | 7/1967 | Broske | |
| 3,335,470 A | 8/1967 | Baer | |
| 3,654,672 A | 4/1972 | Bullar | |
| 3,681,808 A | 8/1972 | Hahn et al. | |
| 3,905,711 A | 9/1975 | Rogers | |
| 4,561,154 A | 12/1985 | Briscoe et al. | |
| 4,602,891 A | 7/1986 | McBride | |
| 4,718,788 A | 1/1988 | Briscoe | |
| RE32,847 E | 1/1989 | Briscoe et al. | |
| 5,243,739 A | 9/1993 | Schmidt | |
| 5,336,846 A | 8/1994 | Sachs | |
| 5,553,360 A | 9/1996 | Lucas et al. | |
| 5,988,929 A | 11/1999 | Doan | |
| 6,058,574 A | 5/2000 | Facey et al. | |
| 6,058,575 A | 5/2000 | Dagan | |
| 6,662,408 B2 | 12/2003 | Perez et al. | |
| 6,854,164 B2 | 2/2005 | Bass et al. | |
| 6,898,827 B1 | 5/2005 | Postelwait et al. | |

* cited by examiner

*Primary Examiner* — Robert J Sandy
*Assistant Examiner* — Michael Lee
(74) *Attorney, Agent, or Firm* — Steven P. Schad

(57) ABSTRACT

A socket and wedge assembly that securely holds wire rope and is easy to release includes a collapsible wedge. The wedge collapses at the front, narrowed end to utilize the high pressures at the front end of the wedge in effecting the collapse and releasing the rope. The wedge includes a movable element that pivots and/or translates to facilitate a quick and reliable collapse of the wedge and release of the wire rope. The wedge includes a cavity to at least partially exhaust the fumes created from cutting the support with a torch for release of the wire rope.

17 Claims, 8 Drawing Sheets

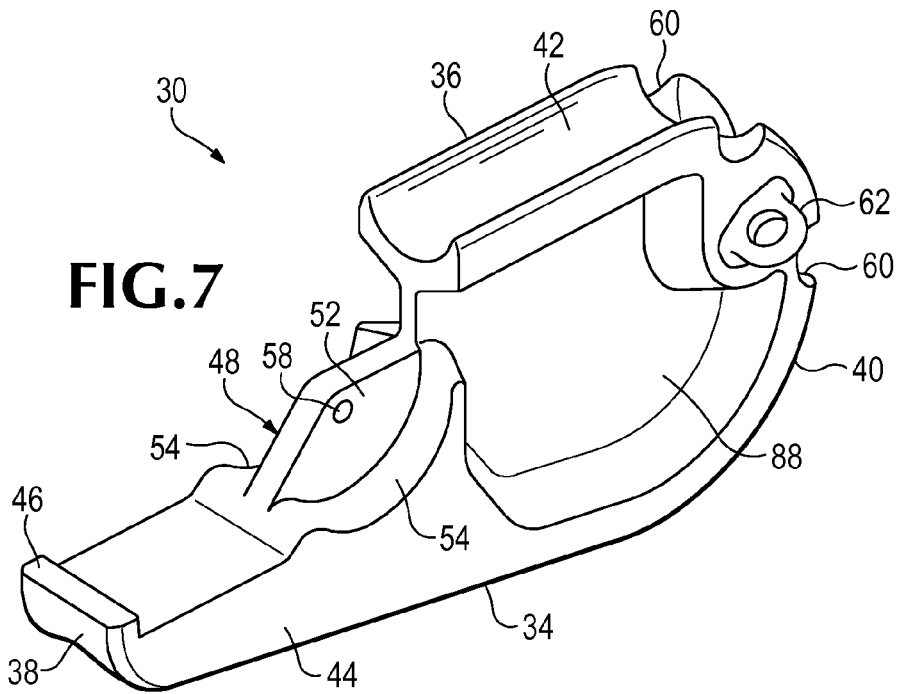

WEDGE AND SOCKET ASSEMBLY

FIELD OF THE INVENTION

The present invention pertains to a wedge and socket assembly for securing a wire rope, which is particularly useful in heavy load applications such as found in certain excavating machines.

BACKGROUND OF THE INVENTION

Wire ropes are used in certain excavating machines and other machines where heavy lifting or pulling is required. In excavating machines (such as dragline excavating systems and cable shovels), wedge and socket assemblies are commonly used to secure an end of a wire rope. The socket in these assemblies includes a tapered passage or cavity that is adapted to receive the wedge. A wire rope is passed through the tapered passage in the socket, looped about the larger end of a wedge, and then fed back into the passage with the wedge. As the wire rope is tightened, the wedge is firmly fit into the passage so as to securely hold the wire rope against the sidewalls of the tapered passage in the socket. The socket also includes a clevis or other fastening arrangement that is coupled to a component of the machine, chain, etc. While such assemblies are effective in securing the wire rope, they can be difficult to release.

SUMMARY OF THE INVENTION

The present invention pertains to an improved socket and wedge assembly that securely holds wire rope but which also enables an easy release, and in particular, to a collapsible wedge usable in such an assembly.

In one aspect of the invention, the wedge is collapsible to facilitate an easy release of the wire rope. The wedge collapses at the front, narrowed end to utilize the high pressures at the front end of the wedge in effecting the collapse and releasing the rope.

In another aspect of the invention, the wedge includes a pivotal element attached to a larger base to facilitate a quick and reliable collapse of the wedge and release of the wire rope. In the initial state, the elements comprising the wedge are in a fixed condition to securely hold the wire rope in the socket. In the release state, the pivotal element rotates to a collapsed position for a quick, sure and easy release of the wire rope.

In another aspect of the invention, the collapsible element of the wedge holding the wire rope is subject to pivotal and translational movement to release the rope quickly, easily and efficiently.

In another aspect of the invention, the pivotal element of the wedge has a support that is cut to cause collapse of the wedge and release of the wire rope. The support preferably includes a stop or brace to engage the base and better resist the high pressures that can be experienced in holding the wire rope in the socket.

In another aspect of the invention, the wedge includes a cavity to at least partially exhaust the fumes created from cutting the support with a torch for release of the wire rope.

In another aspect of the invention, the wedge grips the wire rope along only a part of the wedge's periphery. In one construction, the wedge grips the wire rope along only the front portion of the tapered passage, where the highest pressure is experienced, along one side of the wedge, i.e., the portion adapted to collapse when the rope is released. This arrangement focuses the pressure on the wire rope where it best secures it and enables an easier release.

In another aspect of the invention, the wedge collapses and releases the tension contained in secured wire ropes with increased safety to workers. In preferred embodiments of the invention, the components of the wedge remain interconnected during collapse to minimize any risk of parts being forcibly ejected during release of the tension and energy contained in the secured wire rope. Also, even if a portion of the wedge was designed to disconnect or became disconnected from the remaining wedge during collapse, the collapse tends to be inward to further reduce the risk of injury.

BRIEF DESCRIPTION OF THE DRAWINGS

FIG. 7 is a perspective view of a base component of the wedge.

FIG. 8 is a side view of the base component.

DETAILED DESCRIPTION OF THE PREFERRED EMBODIMENTS

The present invention pertains to a socket and wedge assembly 10 for holding a wire rope 11, which comprises a socket 12 and a wedge 14. Assembly 10 can be used to securely hold a wire rope under heavy loading such as may be experienced in excavating machines (such as dragline operations and cable shovels). Nevertheless, assembly 10 could be used in other environments where a wire rope needs to be securely held.

Figure 1:
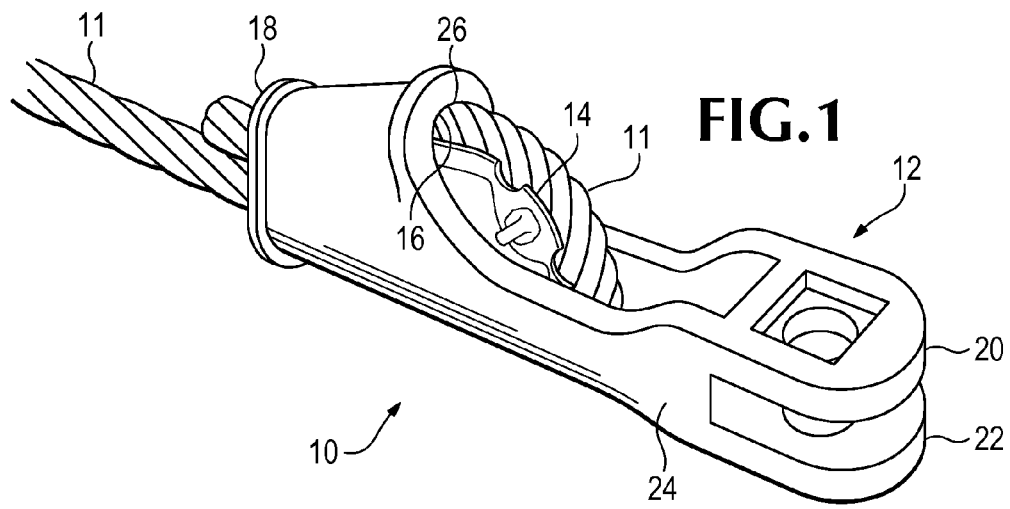
FIG. 1 is a perspective view of a socket and wedge assembly of the present invention.
Figure 2:
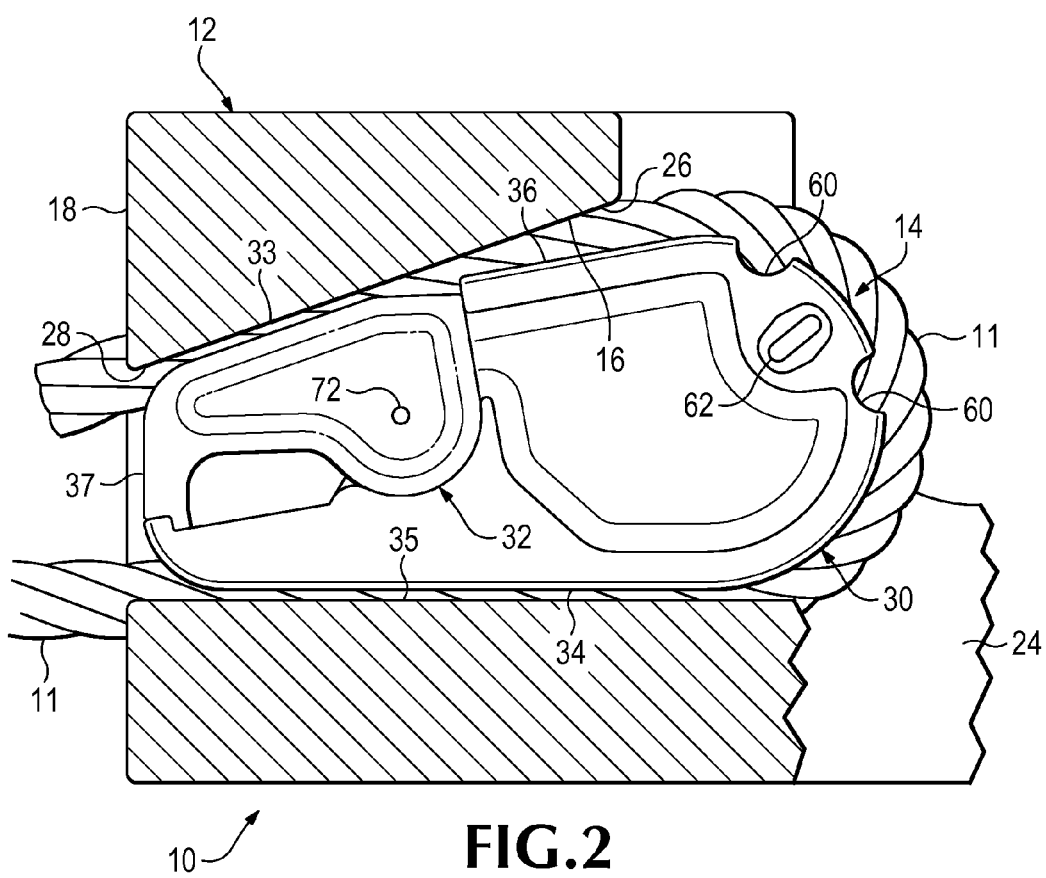
FIG. 2 is a side view of a wedge and socket assembly with the socket shown partially and in cross section.
Figure 3:
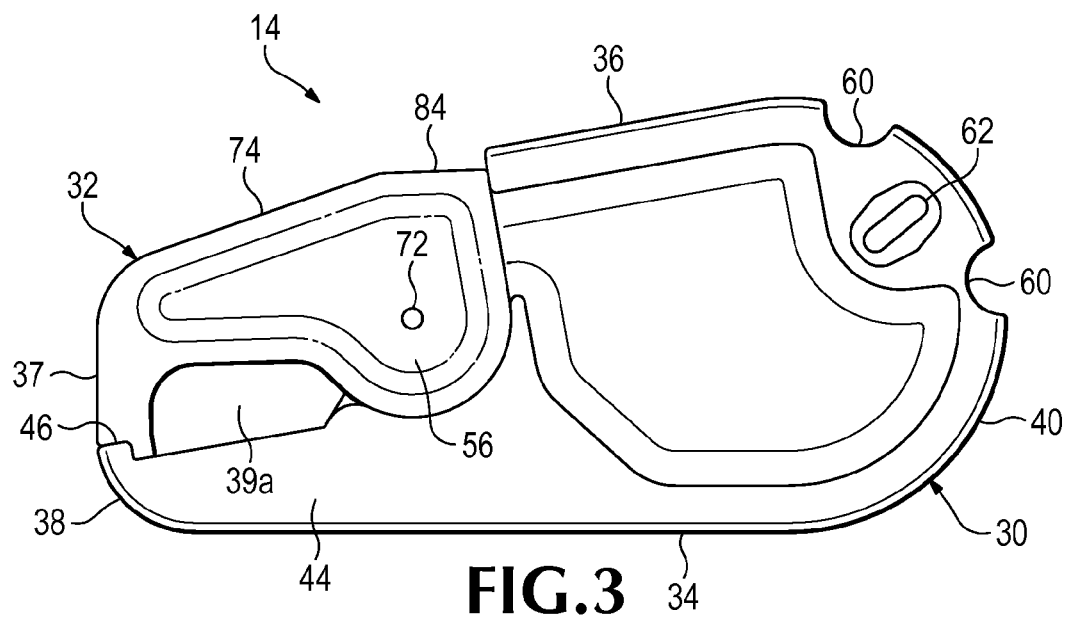
FIG. 3 is a side view of a collapsible wedge of the present invention.
Figure 4:
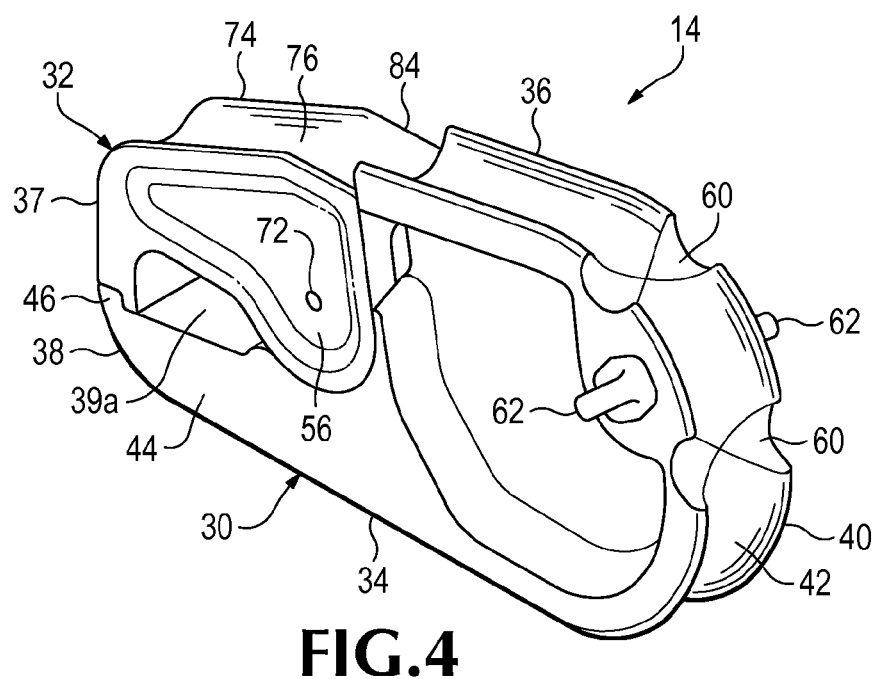
FIG. 4 is a perspective view of the wedge.
Figure 5:
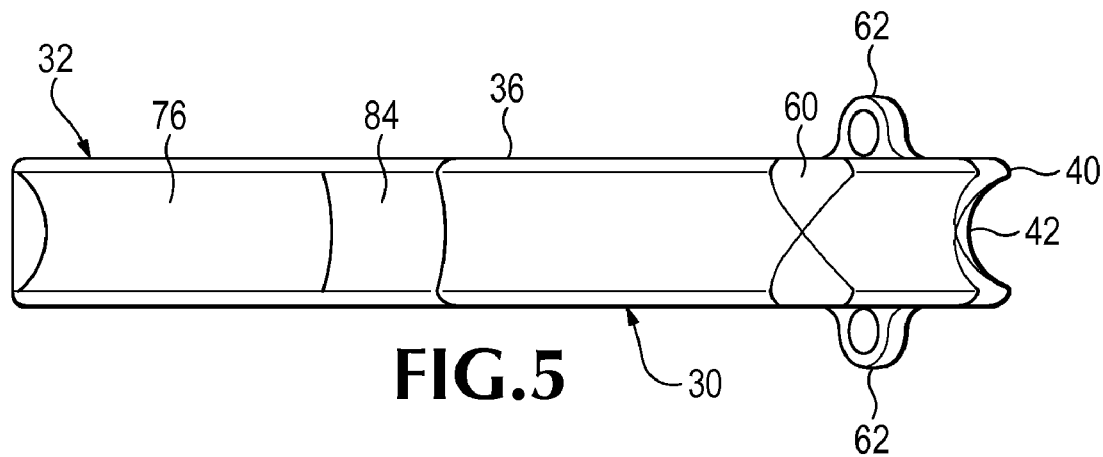
FIG. 5 is a top view of the wedge.
Figure 6:
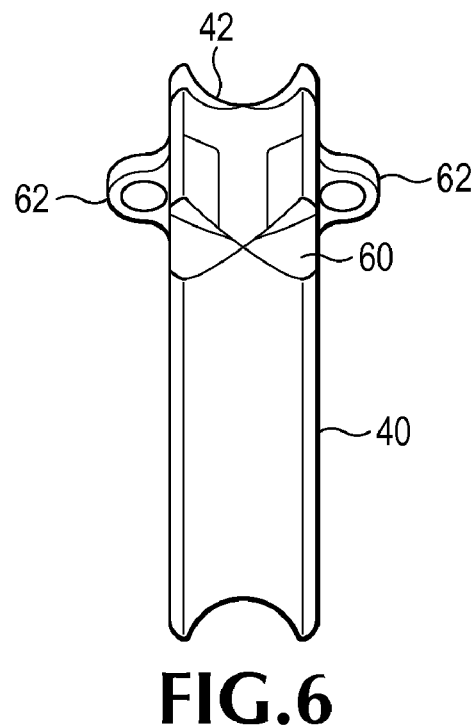
FIG. 6 is a rear end view of the wedge.
Figures 9, 10:
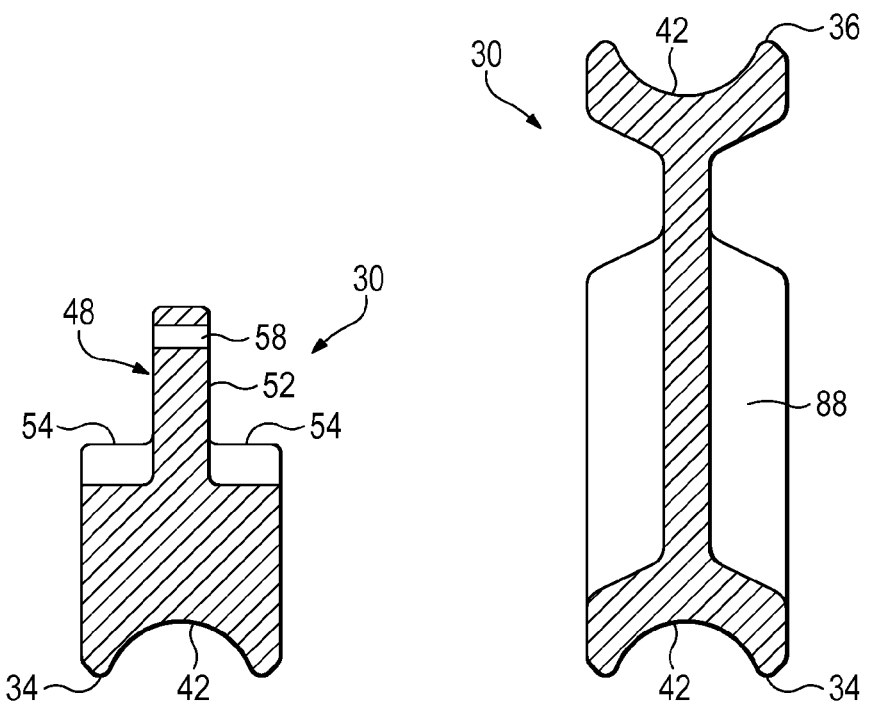
FIG. 9 is a cross-sectional view taken along line 9-9 in FIG. 8.
FIG. 10 is a cross-sectional view taken along line 10-10 in FIG. 9.
Figure 11:
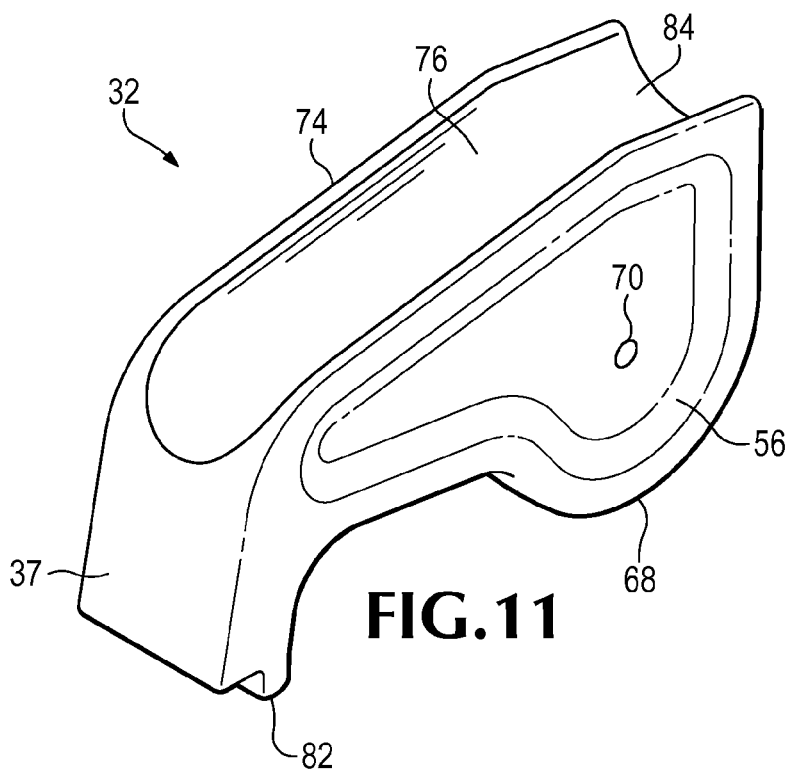
FIG. 11 is a perspective view of a pivoting component of the wedge.
Figure 12:
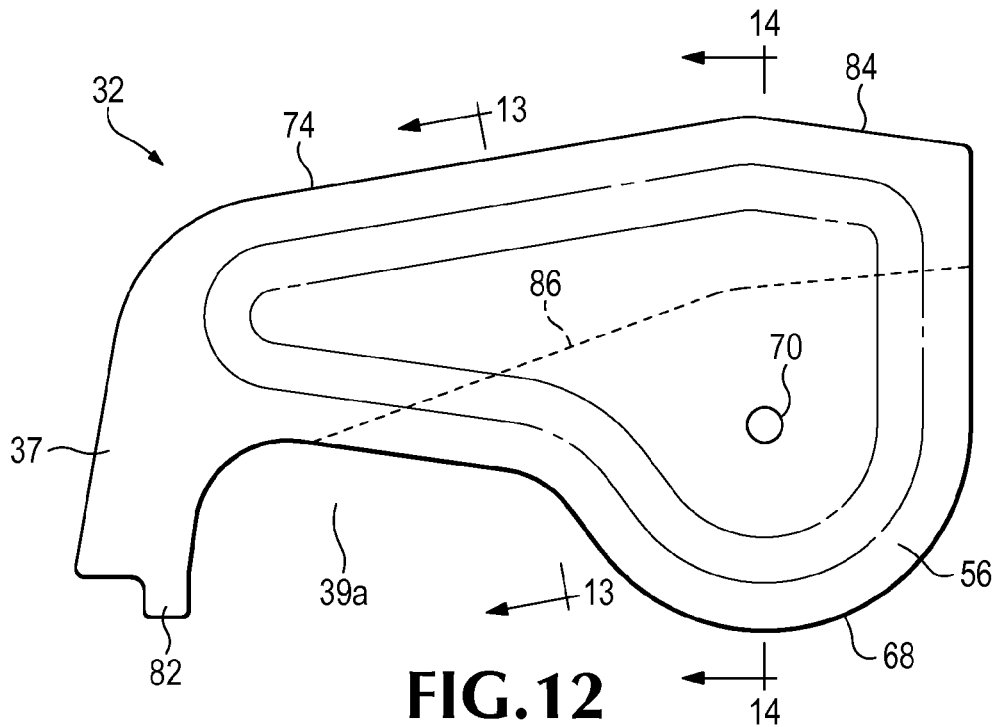
FIG. 12 is a side view of the pivoting component.
Figure 13:
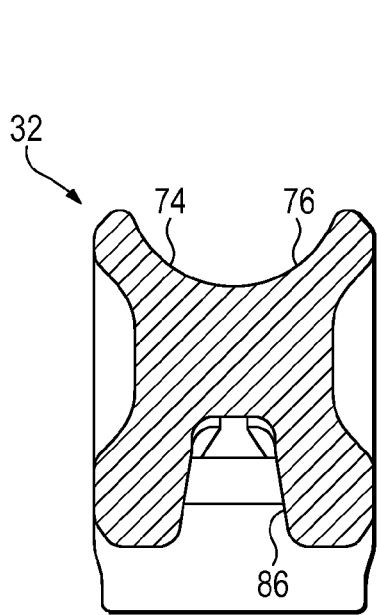
FIG. 13 is a cross-sectional view taken along line 13-13 in FIG. 12.
Figure 14:
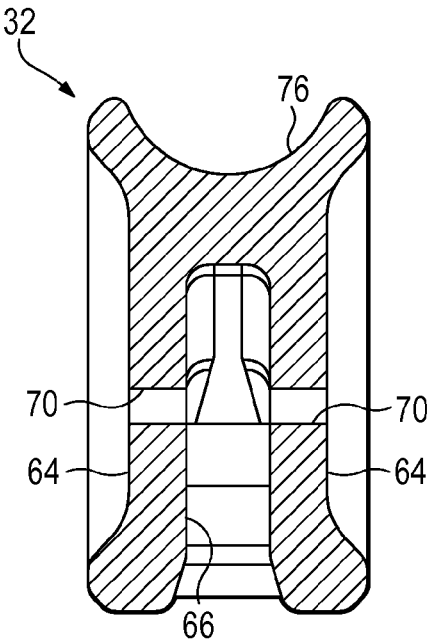
FIG. 14 is a cross-sectional view taken along line 14-14 in FIG. 12.
Figure 15:
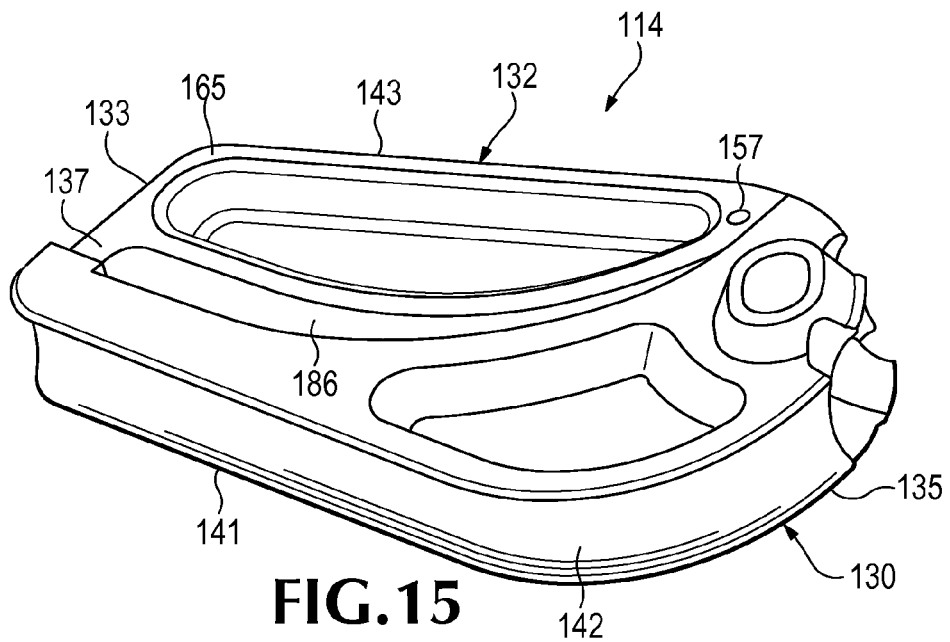
FIG. 15 is a perspective view of an alternative embodiment of a collapsible wedge in accordance with the present invention.
Figure 16:
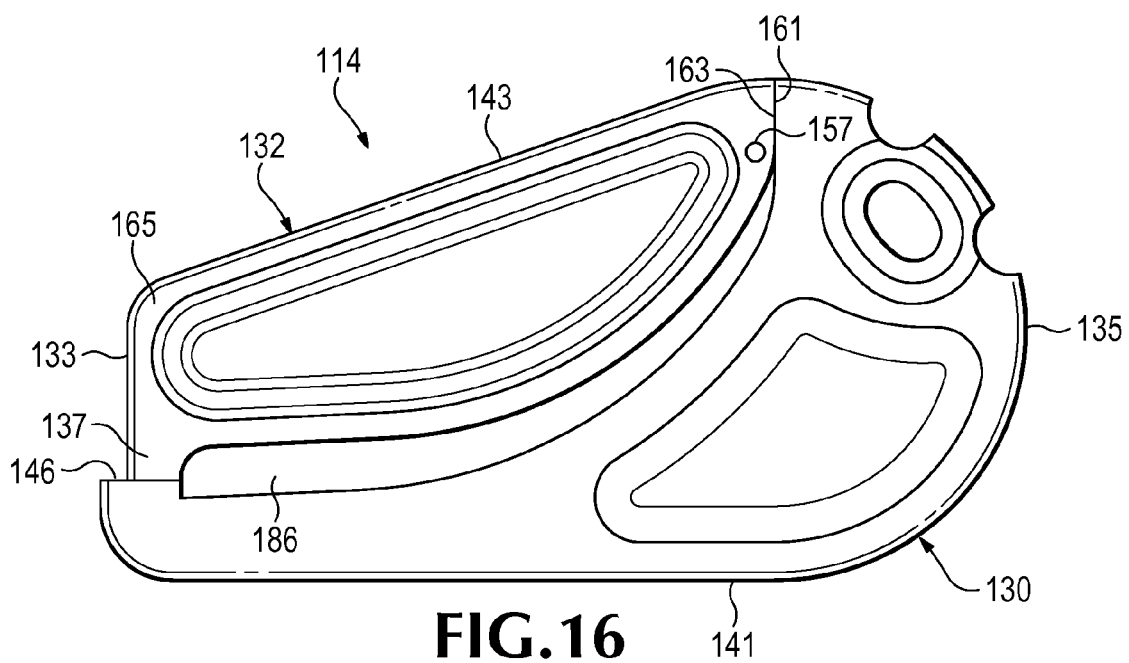
FIG. 16 is a side view of the alternative wedge.

Socket 12 has a conventional design and could have the form of a wide variety of different constructions. In one example, as seen in FIG. 1, socket 12 is an elongate member that includes a tapered passage 16 at a front end 18, a clevis 20 at a rear end 22 to facilitate connection with another component, chain, etc, and a generally hollow intermediate portion 24. Tapered passage 16 includes a rear opening 26 through which wedge 14 is inserted for use, and a narrowed front opening 28 through which the length of wire rope 11 passes.

Wedge 14 includes a base 30 and a movable arm 32 that are coupled together for use in socket 12 to hold a wire rope 11. In use, base 30 and arm 32 are in a fixed condition for mating receipt within the tapered passage 16 of socket 12. Arm 32 grips the wire rope against one sidewall 33 of the tapered passage 16 in socket 12, while base 30 grips the wire rope against the opposite sidewall 35 of the tapered passage 16. Arm 32 is subject to collapse toward base 30 when a support 37 is cut to facilitate removal of the wedge from socket 12 and release of the wire rope 11.

Base 30 includes a first side 34 and an opposite second side 36 that generally converge toward a front narrowed end 38. While first side 34 extends generally the entire length of wedge 14, second side 36 extends only part of the length. In a preferred construction, the second side stops well short of front end 38 to define an open space 39 into which arm 32 is placed. The rear end 40 of base 30 has a convex, curved configuration that joins the first and second sides 34, 36. One or two notches 60 are provided along rear end 40 to facilitate cutting of the wire rope 11 when release is desired. A couple of eyes 62 are preferably provided along rear end 40 near second side 36 to accommodate handling of the wedge in larger assemblies and to ensure proper insertion of the wedge into the socket.

A channel 42 extends along first side 34, second side 36 and rear end 40 for receipt of the wire rope 11. In a preferred embodiment, channel 42 is a trough that extends continuously around nearly the entire perimeter of base 30 excluding the open space 39. First side 34 extends forward farther than second side 36 to define a front projection 44 beneath open space 39. An upstanding brace 46 is preferably formed at the end of projection 44 to provide additional support for arm 32 as discussed below. A mount 48 is provided at the base of front projection 44 for attaching arm 32. In a preferred construction, mount 48 includes an upstanding web 52 positioned between a pair of support surfaces 54. The support surfaces 54 are concave and curved to receive a portion of arm 32. Support surfaces are preferably uniformly curved to define a segment of a circle, though other curvatures are possible. A hole 58 extends through web 52 at the origin of the radius of curvature for support surfaces 54.

Arm 32 includes a support 37 engaging the front end 38 of base 30 and a hub 56 for connecting to mount 48. In use, support 37 holds arm 32 in a fixed condition to tightly hold the wire rope against release. When release of the rope is desired, support 37 is cut so that arm 32 collapses toward base 30 and releases the wire rope. In a preferred construction, hub 56 is secured to mount 48 to facilitate the pivotal movement of arm 32. Arm 32 has a generally U-shaped configuration with part of the open space 39 being a clearance gap 39a to permit collapse of arm 32 when release of the wire rope is desired. The clearance gap 39a may be filled with an elastomeric foam or other elastomer, or left as a void. The use of an elastomer that burns away with the use of the torch to cut support 37, as discussed below, would be preferred.

In a preferred construction, hub 56 includes a pair of spaced flanges 64 that define a gap 66 into which web 52 is received. Flanges 64 include convex, uniformly curved support surfaces 68 that set against support surfaces 54 of base 30. Support surfaces 54, 68 preferably have the same radius of curvature to provide ample support for arm 32 and ease its rotation though support surfaces 54 could have a wider curvature. A hole 70 is provided in each flange 64 to align with hole 58 in web 52 when support surfaces 54, 68 are in contact. A pin 72 is fit through the aligned holes 58, 70 to couple arm 32 to base 30. Pin 72 can be secured by any known means for retaining pivot pins including, for example, the use of a bolt and nut as the pivot pin. Pin 72 is preferably loosely received into holes 58, 70 so that support surfaces 54, 68 support the loads applied to the arm and direct the preferred pivotal movement of the arm. The pin keeps the arm coupled to the base particularly during rope installation and during removal of the wedge from the socket. Nevertheless, the pin or other arrangements (e.g. slots) could be used to support the loads and direct the movement of the arm. In addition, while a pivotal movement for arm 32 is preferred, it is possible for the arm to move toward base 30 (i.e., to collapse) in a non-pivoting manner e.g., through the use of slots and followers.

Arm 32 includes an outer side 74 that defines a channel 76 for receiving wire rope 11. Outer side 74 converges toward first side 34 of base 30 in a forward direction (i.e., towards front end 38). While outer side 74 of arm 32 is generally axially aligned with second side 36 of base 30, they are not in actual alignment. Outer side 74 is inclined at a slightly greater angle to first side 34 as compared to second side 36 so that only the arm 32 (and not second side 36) grips the wire rope 11 between wedge 14 and a sidewall 33 of tapered passage 16 in socket 12. The length of wire rope 11 passing over second side 36 is laterally retained and directed along second side 36 by channel 42, but it does not grip the wire rope 11 against the passage wall 33.

Support 37 is provided at the front end 80 of arm 32 to retain the arm in a fixed holding position relative to the base 30, i.e., in a position to hold the wire rope against sidewall 33 during use. Support 37 extends away from outer side 74 to engage the front end 38 of base 30. A stop 82 is preferably provided at the distal end 84 of support 37 to engage brace 46. When the wedge 14 is tightly fit into the tapered passage 16 of socket 12 to hold the wire rope 11, substantial pressure can be applied to the arm along channel 76. In the holding position, this pressure is resisted by support 37 and hub 56. When high loads are applied to arm 32, pressure mounts to bow arm 32 and bend support 37 outward. The engagement of stop 82 against brace 46 resists such bowing of arm 32 and outward flexing of support 37.

In use, a wire rope 11 is fed into tapered passage 16 of socket 12 through front opening 28 and wrapped about wedge 14 such that it lay in channels 42, 76. Wedge 14 with the wire rope 11 wrapped about it is then placed into the tapered passage through rear opening 26. The application of force on the wire rope pulls the wedge tightly into the tapered passage 16 so that the wire rope is securely held in channels 42, 76, i.e., between first side 34 of base 30 and channel 42 of tapered passage 16 in socket 12 and between channel 76 of arm 32 and sidewall 33. Second side 36 of the base is spaced from sidewall 33 a greater distance than outer side 74 of arm 32 so that the wire rope is not gripped between the wedge and the socket at this location. Even though the wire rope is gripped only at the front of the tapered passage 16 on the arm side of the wedge, the rope is still securely supported against loss. The highest pressures on the arm side of the wedge occur at its front end, and can be used alone to hold the rope in place. Wedge 14, despite gripping the wire rope with only the arm on the one side of the wedge, applies a similar grip and load as compared to a conventional wedge that includes a gripping surface along the entire length of each side of the wedge.

When release of the wire rope is desired, support 37 is cut by a torch or other means. As an alternative, a cut-away or removable block may be provided in lieu of all or part of support 37. Once the support (or block) has been cut or otherwise removed, the pressure on arm 32 caused by tightly gripping the wire rope causes the arm to pivot inward toward front projection 44 of base 30. All surfaces gripping the cable experience and inward pressure when loaded so that the arm will automatically collapse when the support 37 is removed. Since all the gripping pressure of the wedge on the wire rope against sidewall 33 is applied by the arm, the collapse of arm 32 is immediate upon cutting support 37. Moreover, with the shortened length of arm 32 (as compared to the overall wedge length) the arm rotates about a shorter radius. A shorter turning radius, in turn, leads to greater collapse (i.e., movement of the arm away from sidewall 33), and surer release of the wire rope. A clearance section 84 is provided at the rear end of arm 32 to permit rotation of the arm without this portion of the arm rising up with the pivotal motion and gripping or applying unwanted pressure to the wire rope. In a preferred construction, clearance section 84 is a segment that extends rearward at a different inclination than channel 76 so that it does not rise above second side 36 of base 30 when arm 32 is collapsed, though other formations are possible.

A torch is a preferred tool for cutting support 37. In a preferred embodiment, wedge 14 is formed with cavities 86, 88 in one or both of arm 32 and base 30. Cavity 86 in arm 32 is an internal space or passage extending between clearance space 39a and the rear end of the arm 32. Cavity 86 is generally positioned between of hub 56 and channel 76. Cavities 88 are defined by external recessed formed in base 30 rearward of mount 48. Cavity 86 communicates with cavities 88 at the rear end of arm 32 between mount 48 and channel 76. Cavities 86, 88 receive and exhaust fumes from the cutting process. Additional passage for exhausting the fumes to cavities 88 can also be provided by forming gap 66 to be wider than web 52. In any event, cavities 86, 88 are optional irrespective of whether a torch is to be used to cut support 37. It is noted that cavities 86, 88 may each be formed internally or externally of arm 32.

In an alternative embodiment (FIGS. 15-19), a collapsible wedge 114, like wedge 14, includes a base 130 and a movable arm 132 that collapses in a forward direction to release the wire rope. The base 130 and arm 132 collectively define a front end 133, a rounded rear end 135 about which the wire rope is wrapped, and pair of generally linear, rearwardly diverging sides 141, 143. In contrast to wedge 14, arm 132 contacts and grips the wire rope along substantially the entire length of side 143 of the wedge. The use of a longer arm to grip the wire rope reduces the risk that the wire rope will be crushed during use, which may cause the diameter of the rope to lessen and, in some cases, loosen the wedge's grip on the wire rope. Accordingly, wedge 114 provides an enhanced level of security in the holding the wire rope. Nevertheless, even with the longer arm 132, both wedges 14, 114 preferably use a construction where the wedge is formed by a larger base and a smaller arm effecting the desired collapse.

The base 130 and arm 132 collectively define a channel 142 about the outer periphery of the wedge for containing the wire rope. The channel is formed by base 130 along side 141 and rear end 135, and by arm 132 along side 143 to form a substantially continuous channel, preferably U-shaped, for receiving the wire rope.

A coupling 147 is provided to join arm 132 to base 130 and hold the components together for installation while still permitting forward collapse of the arm when removal is desired. In the illustrated embodiment, arm 132 and base 130 are loosely joined to permit pivoting and translational movement of the arm when release is desired. However, the arm may be moved by way of a pivoting or translational motion. The benefits gained by a forward collapse of the wedge is not dependent on the way the arm moves or whether the wedge uses a larger base-smaller arm construction as is set forth in the preferred embodiment. Accordingly, the wedge could have an arm that collapses in a pivotal motion, translation motion, or in a combination of pivot and translation movement. Further, these various movements are possible with short arms (e.g., less than half of the overall length of a side of the wedge), longer arms (e.g., extending more than half the length of a side of the wedge), or the use of an arm that is essentially the mirror image of the base (i.e, using two co-equal components). Also, benefits gained in releasing the wire rope can be realized through the use of a base and arm construction, i.e., where the base is larger than the arm, irrespective of whether the collapse is forward or rearward. However, in the preferred construction, the collapse is forward and the collapse is effected by an arm which is smaller than the base.

Figure 17:
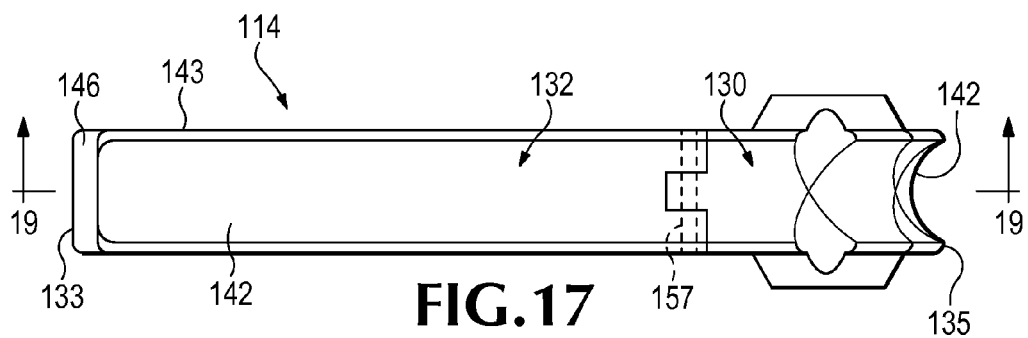
FIG. 17 is a top view of the alternative wedge.
Figure 18:
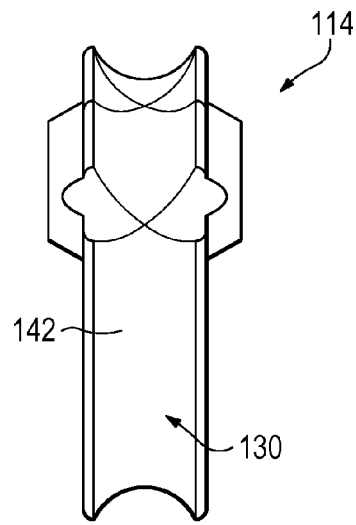
FIG. 18 is a rear view of the alternative wedge.
Figure 19:
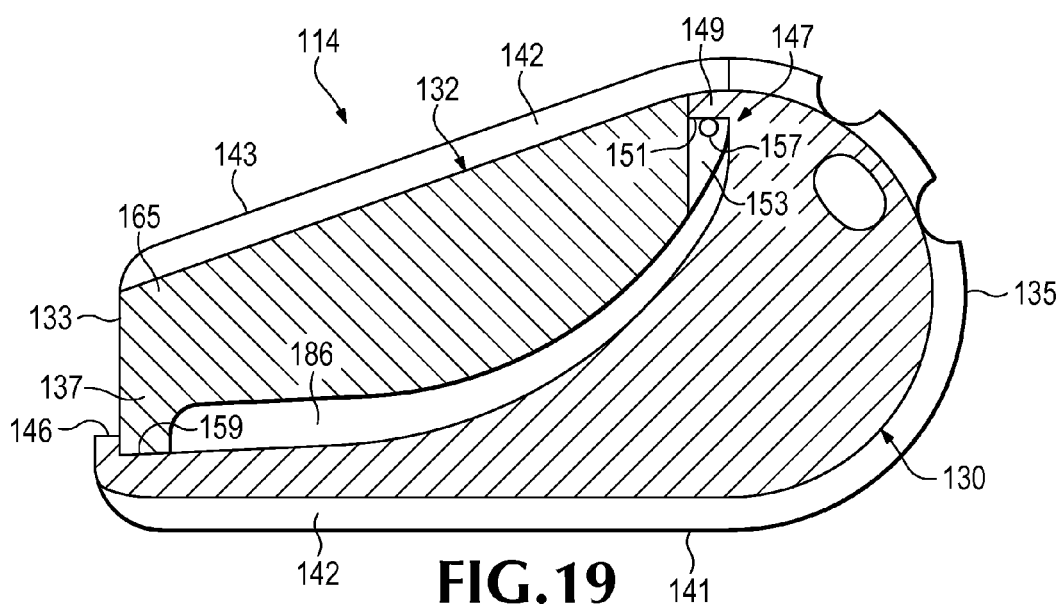
FIG. 19 is a cross-sectional view taken along line 19-19 in FIG. 17.

In one example of a coupling 147, a projection 149 extends forward from base 130 along side 143 to define an inner shoulder 151. As seen in FIG. 17, projection 149 has a thinner width than the channel 142 and the main portion of base 130. Arm 132 includes a complementary groove 153 along its rear end 155 that is configured to receive projection 149. As seen in FIG. 19, groove 153 extends the entire depth of arm 132. A pin 157 is received through aligned holes in arm 132 to set just beneath shoulder 151; pin 157 could be in contact with or spaced from the shoulder. Shoulder 151 could be linear, curved, angular or have another configuration. Nevertheless, other kinds of coupling arrangements permitting collapse of arm 132 could also be used. In addition, the arm and base could be coupled with means other than a pin such as, for example, a collapsible foam within cavity 186.

Arm 132 preferably includes a front support 137 that projects downward to rest against a front base bearing surface 159. A brace or rim 146 extends around the outside of support 137 along the front and both sides. This brace limits movement of the support in a forward or lateral direction. A rear bearing surface 161 of arm 132 abuts against a rear base bearing surface 163 on base 130. Although support 137 is preferably an integral part of arm 132 it could be an integral portion of the base or a separate component that is attached to either the arm or the base. Moreover, the support could be formed by a plurality of components if desired so long as they can be readily cut or otherwise removed when release of the wire rope is desired. If the support is a separate component attached to the base, the front and lateral support provided by brace 146 may be provided by the support. The construction or position of the support could vary considerably and encompasses the portion of the wedge that is removed to cause the desired collapse.

The abutment of support 137 against brace 146 and of rear bearing surface 161 against rear base bearing face 163 hold the arm from moving axially relative to the base. The receipt of projection 149 in groove 153 along with the receipt of support 137 between the side portions of brace 146 prevent the arm from moving laterally relative to the base. The insertion of pin 157 beneath shoulder 151 prevents disconnection of the arm from the base. In this way, wedge 114 can be easily inserted into socket 12 as a single unit.

When release of the wire rope is desired, support 137 is cut by a torch or other means. Although removal of support 137 by a torch is preferred, removal of the support does not require complete removal of the element. Rather, removal of the support means that the support is moved out of its supporting position even if it continues to exist and remains a part of the collapsed wedge. In any event, the surfaces gripping the wire rope in use experience considerable inward pressure on account of the tight grip on the rope. As a result, arm 132 automatically collapses when support 137 is removed, i.e. arm 132 will pivot such that the front end 165 of the arm drops toward front base bearing surface 159. The pressure also will tend to move arm 132 inward in a translation motion as the fit of the arm loosens with the removal of support 137. Pin 157 does not impede this motion because it is unencumbered in the inward direction, i.e., it is free to move inward along groove 153 away from shoulder 151. The pin does not move inward in the operating condition because of the abutment of support 137 against front base bearing surface 159 and rear bearing surface 163 against rear base bearing surface 163. This inward translation in combination with the forward pivoting motion of arm 132 results in a sure release of the wire rope for removal of the wedge.

As with wedge 10, wedge 110 includes a cavity 186 between arm 132 and base 130. Cavity 186 not only provides clearance for movement of arm 132, but also preferably exhausts fumes from the cutting process.

In both wedges designs, the wedge is able to collapse and release the tension contained in secured wire ropes with minimal risk to workers' safety. In wedges 14, 114, the components of the wedge remain interconnected during collapse to lessen the risk of parts being forcibly ejected during release of the tension and energy contained in the secured wire rope. In wedge 14, the arm 32 remains pinned to the base 30. While pin 157 in wedge 114 is not fixed in the same way, the fit and position of arm 132 causes the arm to remain with the base, i.e., the arm tends to collapse against the base due to cutting the wire ropes as opposed to being forced away from the assembly. Similarly, if the support or other portion of the wedge were designed to disconnect or became disconnected from the remaining wedge portion during collapse, the collapse tends to be inward as noted above to minimize the risk of injury to workers.

The invention claimed is:

1. A collapsible wedge for holding a wire rope within a socket, the wedge comprising (i) a base, (ii) an arm coupled to the base, the base and the arm collectively defining a narrow front end, a wide rear end, rearwardly diverging sides extending between the front and rear ends, and an external channel along the sides and rear end in which is received the wire rope to be secured in the socket, and (iii) a removable support proximate the front end which maintains the arm in a spaced position relative to the base to secure the wire rope in the socket when in use and which when removed permits movement of the arm toward the base to reduce the width of the wedge and permit release of the wire rope, wherein the base includes a brace that projects outward to overlap and abut a front end of the arm to restrict forward movement of the arm while securing the wire rope.

2. A collapsible wedge in accordance with claim 1 wherein the arm pivots relative to the base when the support is removed.

3. A collapsible wedge in accordance with claim 2 wherein the arm translates toward the base when the support is removed.

4. A collapsible wedge in accordance with claim 1 wherein the arm translates toward the base when the support is removed.

5. A collapsible wedge in accordance with claim 1 wherein the support is integral with the arm.

6. A collapsible wedge in accordance with claim 1 further including a cavity between the arm and the base which exists before and after collapse of the wedge and is able to exhaust fumes from a torch cutting the support.

7. A collapsible wedge in accordance with claim 1 wherein the arm is smaller than the base.

8. A collapsible wedge in accordance with claim 7 wherein the arm is less than about half of the overall length of the wedge.

9. A collapsible wedge for holding a wire rope within a socket, the wedge comprising two components including an arm and a base, a pivot pin coupling the two components together with the arm being shorter than the base, and a removable support collectively defining a narrowed front end, an expanded rear end, rearwardly diverging sides extending between the front and rear ends, and an external channel along the sides and rear end in which is received the wire rope to be secured in the socket, wherein removal of the support causes the wedge to collapse at the front end to release the wire rope from within the socket.

10. A collapsible wedge in accordance with claim 9 wherein the support is integral with one of the components.

11. A collapsible wedge for holding a wire rope within a socket, the wedge comprising (i) a base, (ii) an arm pivotally coupled to the base, the arm being smaller than the base and extending substantially less than the length of the diverging sides, the base and the arm collectively defining a narrowed front end, an expanded rear end, rearwardly diverging sides extending between the front and rear ends, and an external channel along the sides and rear end in which is received the wire rope to be secured in the socket, and (iii) a removable support which maintains the arm in a spaced position relative to the base to secure the wire rope in the socket when in use and which when removed permits pivoting of the arm toward the wedge to reduce the width of the wedge and permit release of the wire rope from within the socket.

12. A collapsible wedge in accordance with claim 11 wherein the support is proximate the front end and the arm pivots toward a front end of the base.

13. A collapsible wedge in accordance with claim 9 wherein the shorter component is less than about half of the overall length of the wedge.

14. A collapsible wedge in accordance with claim 11 wherein the shorter component is less than about half of the overall length of the wedge.

15. A wedge and socket assembly for holding a wire rope comprising:
a socket defining a narrowing cavity; and
a collapsible wedge for holding a wire rope within the socket, the wedge including (i) a base, (ii) an arm coupled to the base, the base and the arm collectively defining a narrow front end, a wide rear end, rearwardly diverging sides extending between the front and rear ends, and an external channel along the sides and rear end in which is received the wire rope to be secured in the socket, and (iii) a removable support proximate the front end which maintains the arm in a spaced position relative to the base to secure the wire rope in the socket when in use and which when removed permits movement of the arm toward the wedge to reduce the width of the wedge and permit release of the wire rope, wherein the base includes a brace that projects outward to overlap and abut a front end of the arm to restrict forward movement of the arm while securing the wire rope from within the socket.

16. A wedge and socket assembly for holding a wire rope comprising:
a socket defining a narrowing cavity; and
a collapsible wedge for holding a wire rope within the socket, the wedge including two components including an arm and a base, a pivot pin coupling the two components together with the arm being shorter than the base, and a removable support collectively defining a narrowed front end, an expanded rear end, rearwardly diverging sides extending between the front and rear ends, and an external channel along the sides and rear end in which is received the wire rope to be secured in the socket, wherein removal of the support causes the wedge to collapse at the front end to release the wire rope from within the socket.

17. A wedge and socket assembly for holding a wire rope comprising:
   a socket defining a narrowing cavity; and
   a collapsible wedge for holding a wire rope within the socket, the wedge comprising (i) a base, (ii) an arm pivotally coupled to the base, the arm being smaller than the base and extending substantially less than the length of the diverging sides, the base and the arm collectively defining a narrowed front end, an expanded rear end, rearwardly diverging sides extending between the front and rear ends, and an external channel along the sides and rear end in which is received the wire rope to be secured in the socket, and (iii) a removable support which maintains the arm in a spaced position relative to the base to secure the wire rope in the socket when in use and which when removed permits pivoting of the arm toward the wedge to reduce the width of the wedge and permit release of the wire rope from within the socket.

* * * * *